(12) United States Patent
Lau

(10) Patent No.: US 9,707,745 B2
(45) Date of Patent: Jul. 18, 2017

(54) MACHINE AND METHOD FOR PRODUCING INFLATABLE PRODUCTS

(71) Applicant: Sun Pleasure Company Limited, San Po Kong, Kowloon (HK)

(72) Inventor: Vincent W. S. Lau, Kowloon (HK)

(73) Assignee: Sun Pleasure Co. Ltd., Hong Kong (HK)

( * ) Notice: Subject to any disclaimer, the term of this patent is extended or adjusted under 35 U.S.C. 154(b) by 0 days.

(21) Appl. No.: 14/883,828

(22) Filed: Oct. 15, 2015

(65) Prior Publication Data

US 2017/0106638 A1    Apr. 20, 2017

(51) Int. Cl.
| | | |
|---|---|---|
| *B32B 41/00* | (2006.01) | |
| *B32B 37/06* | (2006.01) | |
| *B32B 37/10* | (2006.01) | |
| *B32B 38/10* | (2006.01) | |

(52) U.S. Cl.
CPC .............. *B32B 37/06* (2013.01); *B32B 37/10* (2013.01); *B32B 38/10* (2013.01)

(58) Field of Classification Search
CPC .......... B32B 37/06; B32B 38/10; B32B 37/10
USPC ............ 156/60, 64, 350, 351, 368, 378, 379
See application file for complete search history.

(56) References Cited

U.S. PATENT DOCUMENTS

2005/0247395 A1* 11/2005 Summers ............ B29C 66/3282
156/156

* cited by examiner

*Primary Examiner* — Alison L Hindenlang
*Assistant Examiner* — Joshel Rivera
(74) *Attorney, Agent, or Firm* — Raymond Sun

(57) ABSTRACT

A machine and method for making an inflatable product is disclosed. The inflatable product has an upper layer and a lower layer. The machine having a presser, a welder press frame, an upper flat plate secured to the presser, and a lower flat plate secured to the welder press frame. Each flat plate has a plurality of slide rests, each slide rest having a plurality of detachable plates positioned along the slide rest. A lower layer of material is placed on top of the lower flat plate and on top of the plurality of detachable plates on the lower flat plate. A plurality of die assemblies is positioned on top of the lower layer of material in a manner where each die assembly is aligned with a corresponding slide rest. Then, an upper layer of material is placed on top of the die assemblies and below the upper flat plate. The upper flat plate is pressed on top of the upper layer of material to perform heat welding.

5 Claims, 16 Drawing Sheets ously employed. The high-frequency use machine includes an upper flat plate and a lower flat plate. A clamp die is provided between the upper flat plate and the lower flat plate. The material (e.g., PVC) for the bottom layer is placed on top of the lower flat plate, and then a PVC coil beam is inserted in the die. This PVC coil beam is used in the finished inflatable product to support the two opposing layers of material for the finished product. The die is then placed on top of the material for the bottom layer, and then the material (e.g., PVC) for the upper layer is placed on top of the die. Then, the upper flat plate and the lower flat plate are closed, resulting in the PVC coil beam (i.e., the material inside the die) being welded together with the material for the top and bottom layers.

MACHINE AND METHOD FOR PRODUCING INFLATABLE PRODUCTS

BACKGROUND OF THE INVENTION

1. Field of the Invention

The present invention relates to a toot for producing inflatable products, and particularly to a high-frequency machine for producing inflatable products.

2. Description of the Prior Art

At present, for a majority of inflatable products in the market, the material for the top layer and the bottom layer are formed from PVC, TPU, and similar materials. During production, a high-frequency use machine is generally employed. The high-frequency use machine includes an upper flat plate and a lower flat plate. A clamp die is provided between the upper flat plate and the lower flat plate. The material (e.g., PVC) for the bottom layer is placed on top of the lower flat plate, and then a PVC coil beam is inserted in the die. This PVC coil beam is used in the finished inflatable product to support the two opposing layers of material for the finished product. The die is then placed on top of the material for the bottom layer, and then the material (e.g., PVC) for the upper layer is placed on top of the die. Then, the upper flat plate and the lower flat plate are closed, resulting in the PVC coil beam (i.e., the material inside the die) being welded together with the material for the top and bottom layers.

The existing machine suffers from a number of drawbacks. First, it is difficult to level the flat plates, so that the flatness of the upper flat plate and the flatness of the lower flat plate will change slightly. As a result, when the material for the top and bottom layers is welded, some portions might be burned through, while some portions are not welded together. Second, frequent use of the high-frequency use machine during production is likely to burn the machine board, and it is time-consuming and dangerous to repair the burned portion because the entire flat plate has to be taken out of use and repaired. The production efficiency is therefore reduced, and the production risk is increased.

Therefore, there is a need to provide a high-frequency machine that overcomes the drawbacks with the conventional high-frequency machines noted above.

SUMMARY OF THE DISCLOSURE

It is an object of the present invention to provide a high-frequency use machine for producing inflatable products, which can protect an upper flat plate and a lower flat plate of the high-frequency use machine from being damaged.

It is another object of the present invention to provide a high-frequency use machine for producing inflatable products which is convenient in use, which is easy to maintain, and which improves working efficiencies.

To achieve the objects of the present invention, there is provided a method for making an inflatable product having an upper layer and a lower layer, which includes for quick, easy and safe replacement of defective plates that are used with the die cores. The method of the present invention provides a machine having a presser, a welder press frame, an upper flat plate secured to the presser, and a lower flat plate secured to the welder press frame. Each flat plate has a plurality of press blocks secured to the respective plate in an arrangement where a space is defined between adjacent pairs of press blocks. A plurality of slide rests are then positioned on to each flat plate, with each slide rest positioned in the space between each pair of adjacent press blocks, and with each slide rest having a plurality of detachable plates positioned along the slide rest. A lower layer of material is placed on top of the lower flat plate and on top of the plurality of detachable plates on the lower flat plate. A plurality of die assemblies is positioned on top of the lower layer of material in a manner where each die assembly is aligned with a corresponding slide rest. Then, an upper layer of material is placed on top of the die assemblies and below the upper flat plate. The upper flat plate is pressed on top of the upper layer of material to perform heat welding, with the plurality of detachable plates on the slide rests of the upper flat plate aligned with the die assemblies and the plurality of detachable plates on the slide rests of the lower flat plate.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
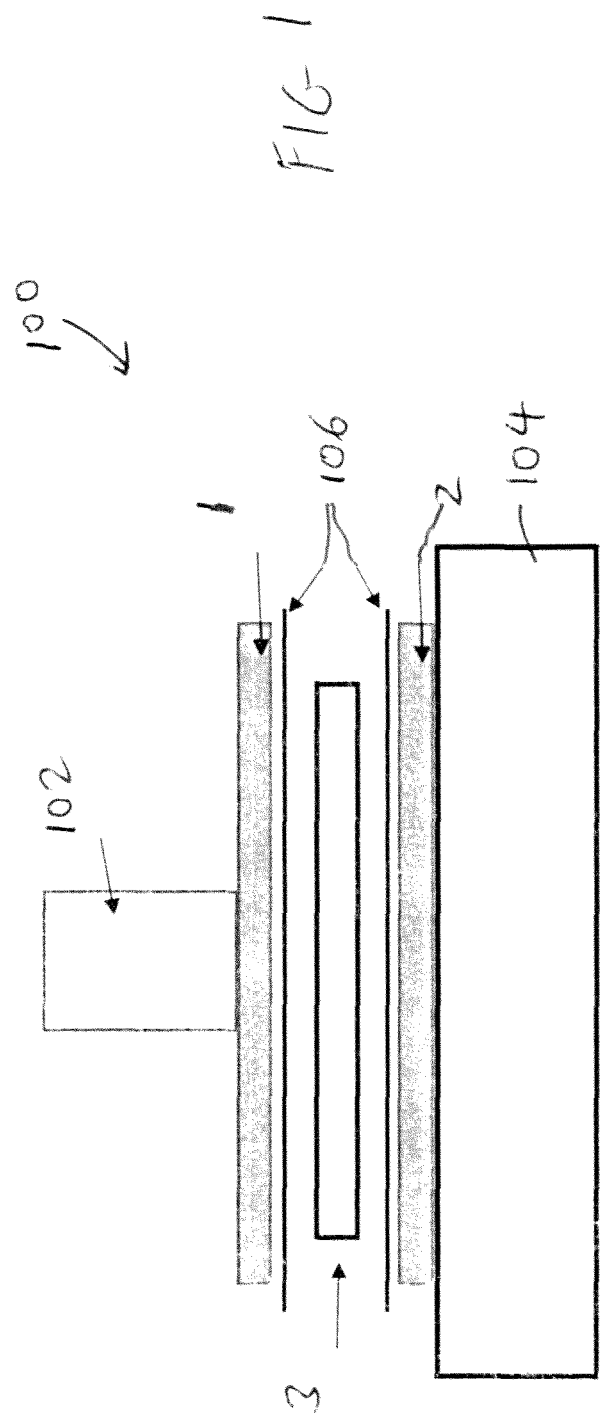
FIG. 1 is schematic drawing illustrating the machine of the present invention.

As shown in FIG. 1, the machine 100 of the present invention includes a conventional hydraulic presser 102 and a conventional welder press frame 104. The present invention provides a novel upper flat plate 1 and a novel lower flat plate 2 that are used to press against a plurality of novel die assemblies 3. PVC sheets 106 can be placed between the upper flat plate 1 and the die assemblies 3, and between the lower flat plate 2 and the die assemblies 3, so as to form the upper and lower layers, respectively, of the inflatable product. The PVC coil beam 108 retained on the separate die cores 6 of the die assemblies 3 are welded to the upper and lower layers of the PVC sheets 106.

Figure 2:
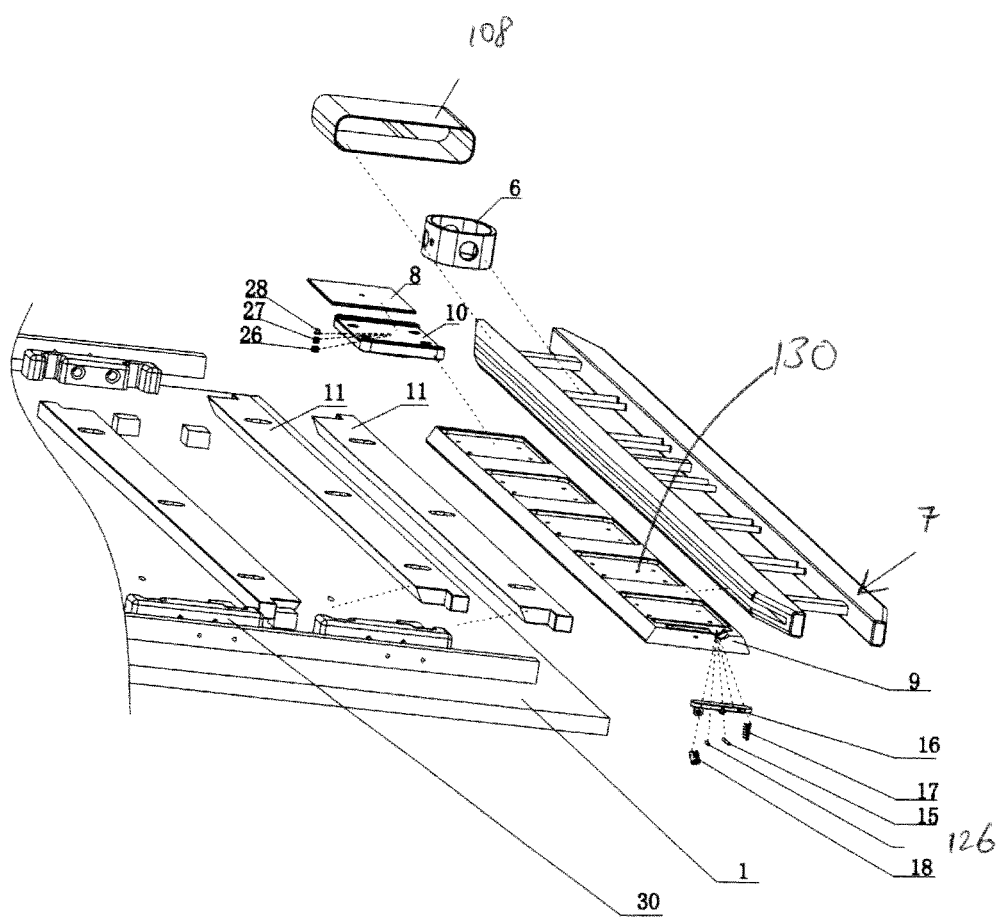
FIG. 2 is an exploded perspective view of the upper flat plate and a die assembly showing how the die assembly is removably connected to the upper flat plate.
Figure 3:
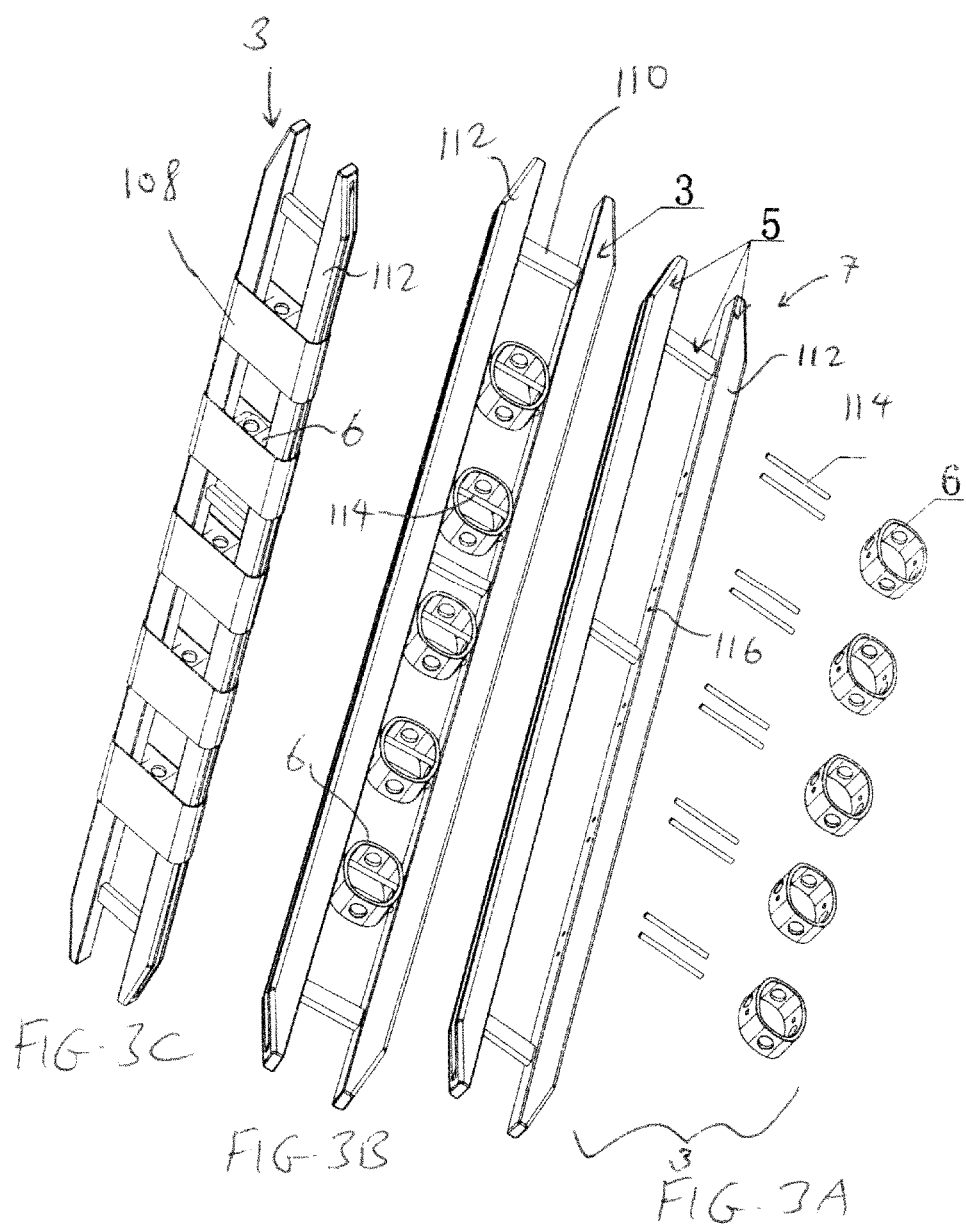
FIG. 3A is an exploded perspective view of the die assembly.
FIG. 3B shows the die assembly of FIG. 3A in its assembled format, but without the coil beam.
FIG. 3C shows the die assembly of FIG. 3A in its assembled format with the coil beam.
Figure 12:
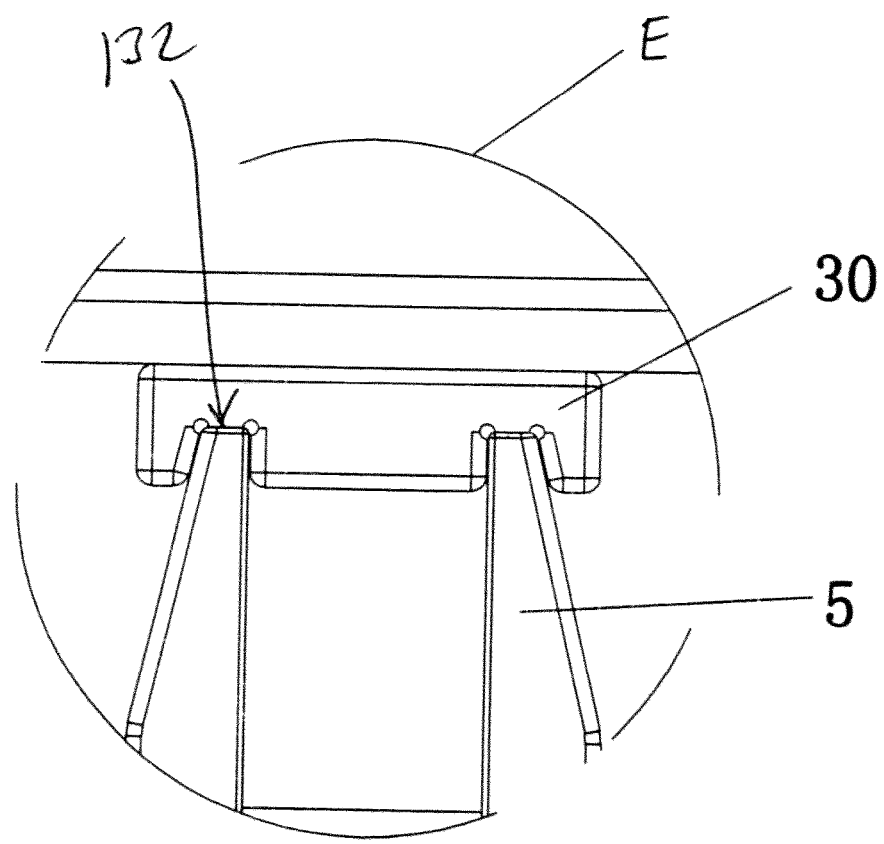
FIG. 12 is an enlarged view of the area E of FIG. 5.

FIG. 2 illustrates the removable connection of a die assembly 3 to the upper flat plate 1. Even though only the upper flat plate 1 is shown in the drawings, the lower flat plate 2 can have the same construction and receive die assemblies 3 in the same manner. The upper flat plate 1 has a plurality of press blocks 11 that are adapted to be screwed to specific locations on the upper flat plate 1. Positioning blocks 30 are positioned at pre-determined aligned locations adjacent opposite side edges, and are adapted to receive opposite ends of the clamp plates 5 of the plate fixtures 7 of each die assembly 3, as shown in FIG. 12.

FIGS. 2, 3A, 3B and 3C illustrate a separate die assembly 3. Each die assembly 3 has a plate fixture 7 which includes a clamp plate 5 that is composed of two separate and space-apart bars 112 connected by a plurality of connecting bars 110. A plurality of die cores 6 are positioned between the bars 112, and held in between the bars 112 via lock pins 114 that are inserted through holes in the die cores 6, with opposite ends of the lock pins 114 retained inside openings 116 on the inside surfaces of the bars 112. The multiple die cores 6 form a copper-ring shape (or any other metal-ring shape). Separate PVC coil beams 108 can be wrapped around the bars 112 at the locations of each separate die core 6. The multiple die cores 6 are arranged in a linear array along each clamp plate 5.

Figure 4:
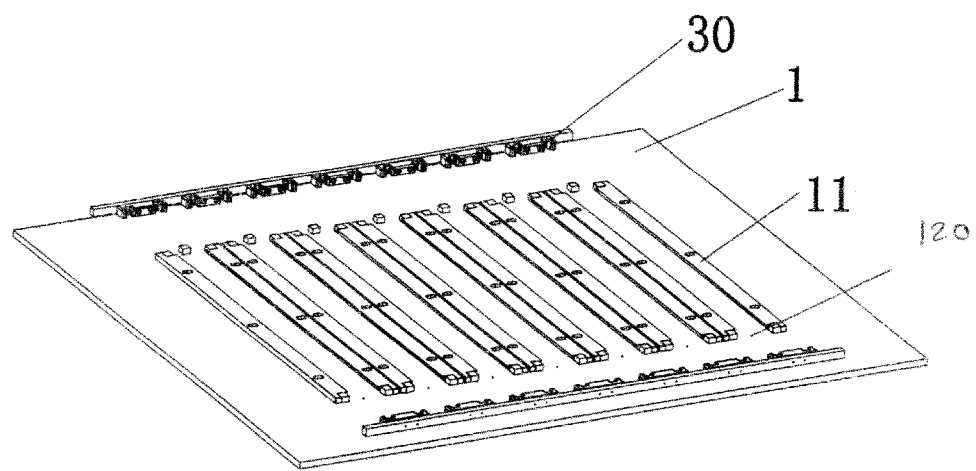
FIG. 4 is a perspective view of the upper flat plate with the press blocks secured thereto.
Figure 5:
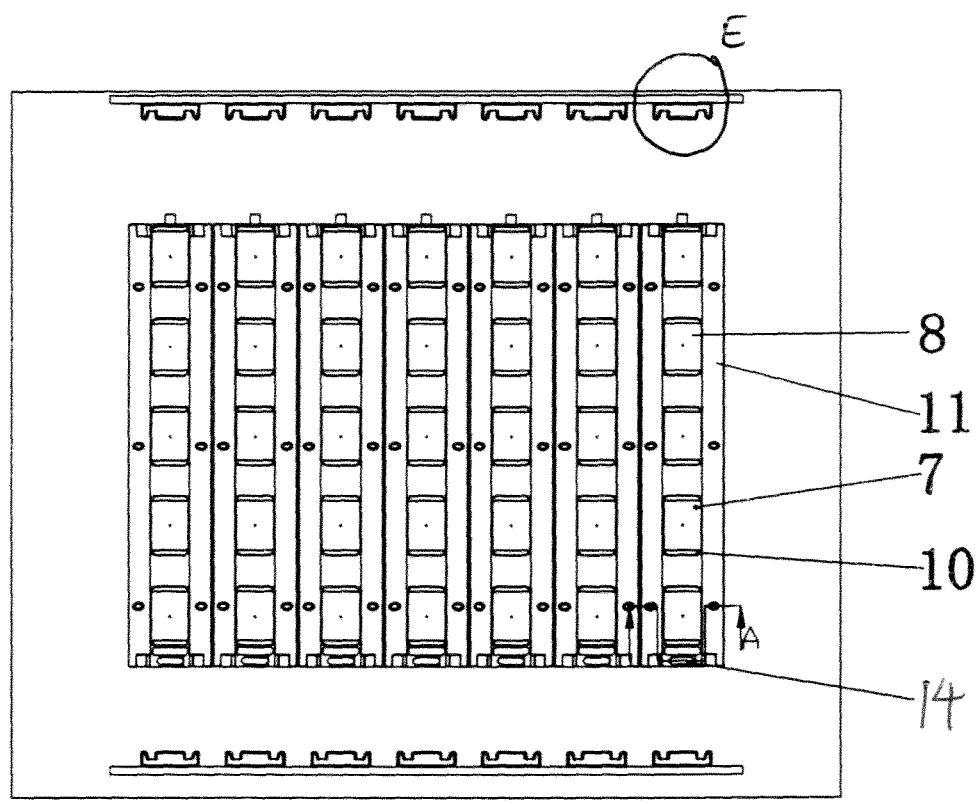
FIG. 5 is a top plan view of the upper flat plate after the slide rests of the plate fixtures have been secured between the press blocks.
Figure 6A:
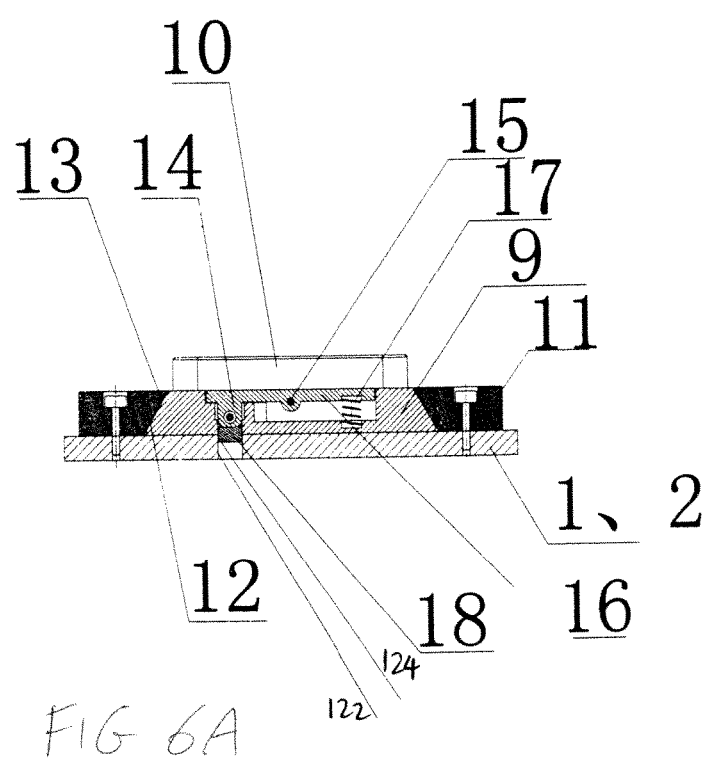
FIG. 6A is a cross-sectional view taken along line A-A in FIG. 5.

FIG. 4 illustrates the upper flat plate 1 with the press blocks 11 secured thereto. As shown in FIG. 4, there is a space 120 between adjacent press blocks 11 for receiving a slide rest 9 therebetween. Referring to FIGS. 2, 5 and 6A, each of the press blocks 11 is provided with an angled edge 12. The slide rests 9 of the plate fixtures 7 are provided with bevel edges 13 that correspond to the angled edge 12 of the press blocks 11 so that each slide rest 9 can be slid into the space 120, with the press blocks 11 limiting the slide rests 9 to movement towards opposite ends, but do not allow lateral movement of the slide rests 9. In other words, each slide rest 9 is retained inside the angled edges 12 of adjacent press blocks 11.

Figure 6B:
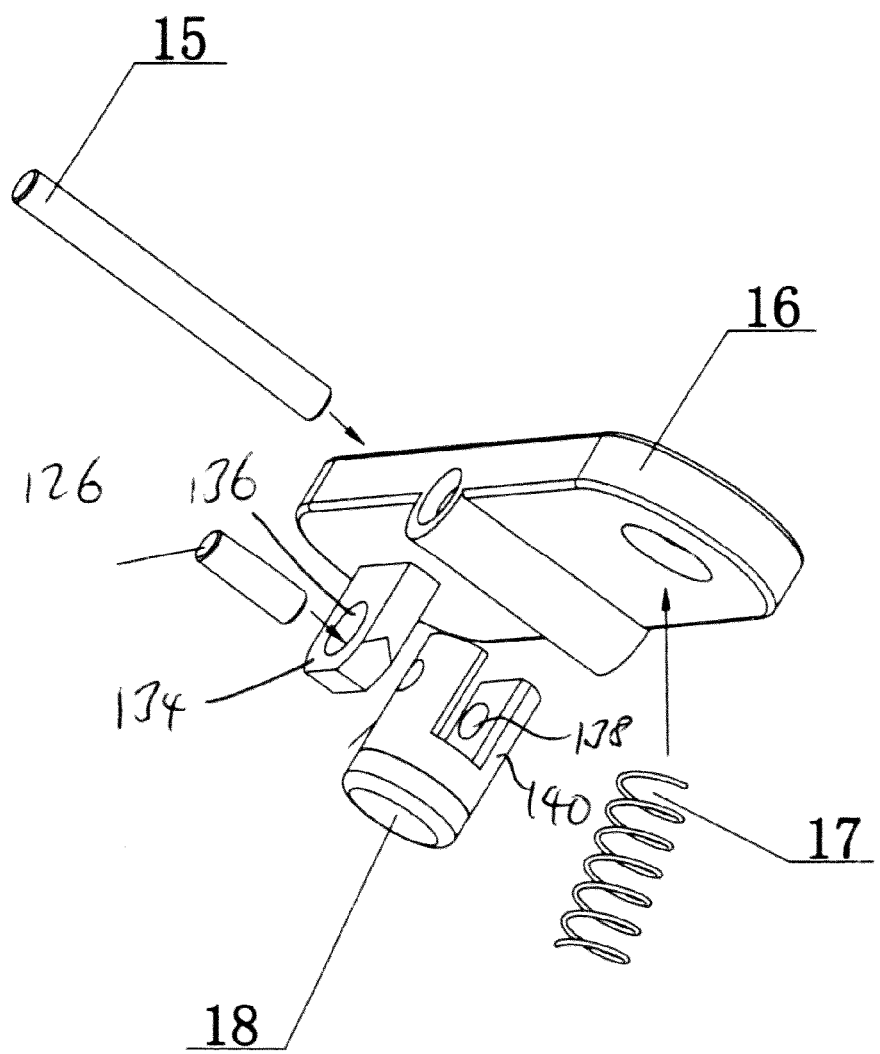
FIG. 6B is an exploded perspective view of a positioning device.
Figure 7B:
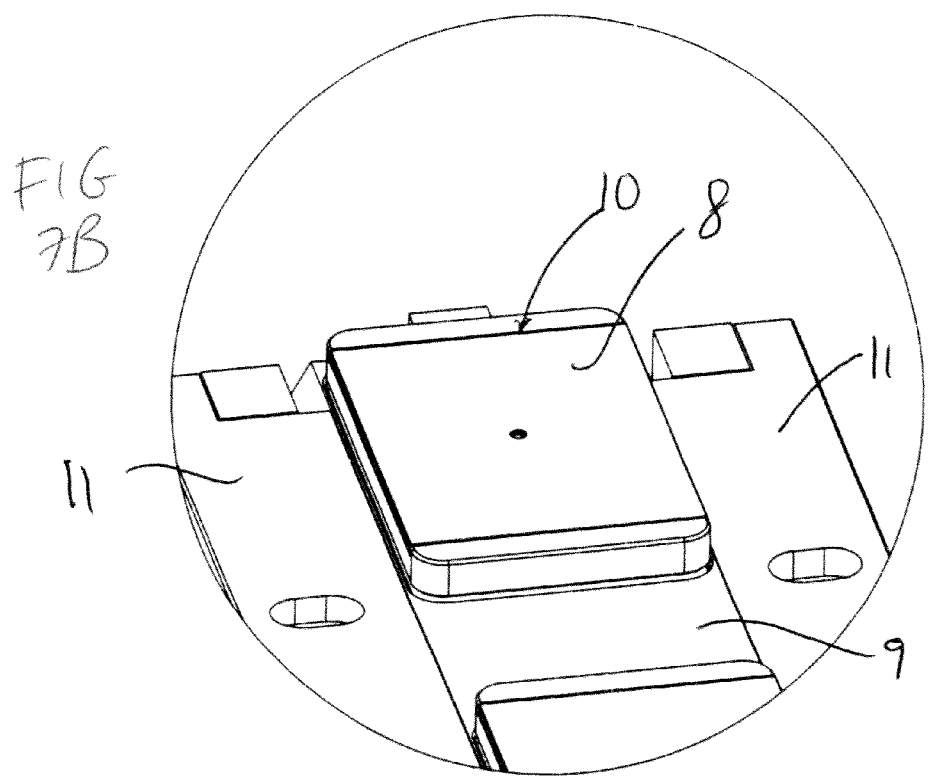
FIG. 7B is an enlarged view of the area D in FIG. 7A.
Figure 7A:
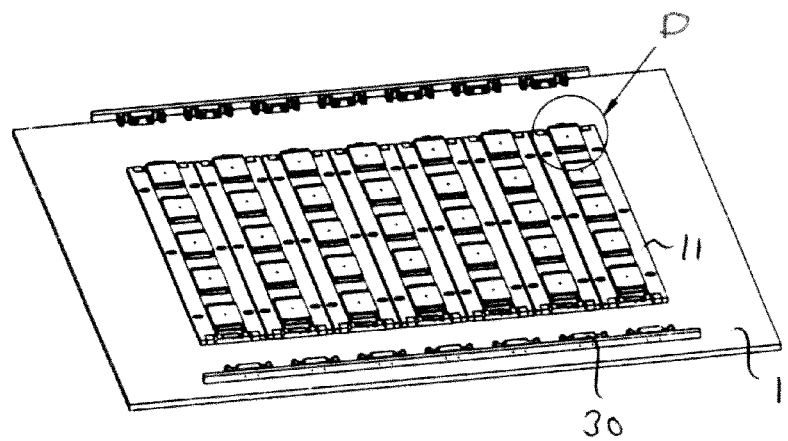
FIG. 7A is a top perspective view of the upper flat plate after the plate fixtures have been secured between the press blocks.

Positioning devices 14 are provided at opposite ends of the slide rests 9 to lock the slide rests 9 in place on the flat plate 1 between two press blocks 11. Referring to FIGS. 6A and 6B, each positioning device 14 includes a rotary pin 15, a tab 16, a spring 17, a positioning block 18 and a lock pin 126. The tab 16 is fixed on the slide rest 9 via the rotary pin 15. The spring 17 is provided at one end of the tab 16. A tongue 134 extends from the other end of the tab 16 and a locking pin 126 is provided to extend through a hole 136 in the tongue 134. The positioning block 18 is pivotably coupled to the tongue 134 via the locking pin 126 which also extends through holes 138 in a pair of aligned legs 140 that extend from the positioning block 18. The positioning block 18 is partially fitted in an opening 124 in the lower surface of the slide rest 9 and also partially fitted into a hole 122 on the upper flat plate 1. The tab 16 can be pressed at the end where the spring 17 is positioned, to pivot the tab 16 about the rotary pin 15, so as to lift the positioning device 14 out of the opening 124 to allow removal of the slide rest 9.

Next, the fixing bases 10 are secured to each slide rest 9. Referring to FIGS. 2 and 7A-11B, each fixing base 10 is removably secured inside one of a plurality of wells 130 provided linearly along each slide rest 9 via screws 20. Each fixing base 10 is adapted to removably secure a detachable plate 8 thereto. The detachable plates 8 (and their corresponding fixing bases 10) are provided at positions on the plate fixtures 7 corresponding to the multiple die cores 6. The detachable plates 8 can be copper plates (or other metal plates). The detachable plates 8 are detachably provided on the outer surfaces of the fixing bases 10. Thus, the detachable plates 8 are provided at positions corresponding to the upper and lower surfaces of each die core 6, and are easily replaced, so that only the damaged plates 8 (e.g., damaged when the machine board is burned) need to be replaced. This allows the production operation to be recovered immediately, thereby shortening the maintenance time (or any down time), and improving production efficiency.

The bottom of each fixing base 10 is provided with bosses 21, and gaskets 22 may be fixedly provided on the bosses 21. By setting the thicknesses of the gaskets 22, the upper surfaces of the fixing bases 10 may be in the same plane on the machine, so that the welding of the products is more uniform during welding, so that the qualified rate of products is improved, and the production cost is reduced. Moreover, by polishing the bosses 21 to maintain the desired degree of flatness, the thicknesses of the fixing bases 10 can also be adjusted. This avoids complicated procedures for polishing the surfaces of the fixing bases 10, further improving the working efficiency.

Figure 8A:
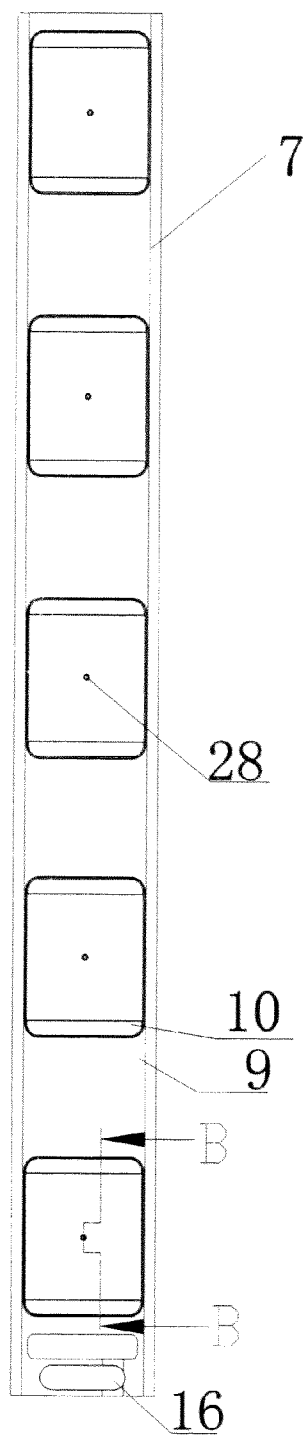
FIG. 8A is top plan view of a plate fixture.
Figure 8B:
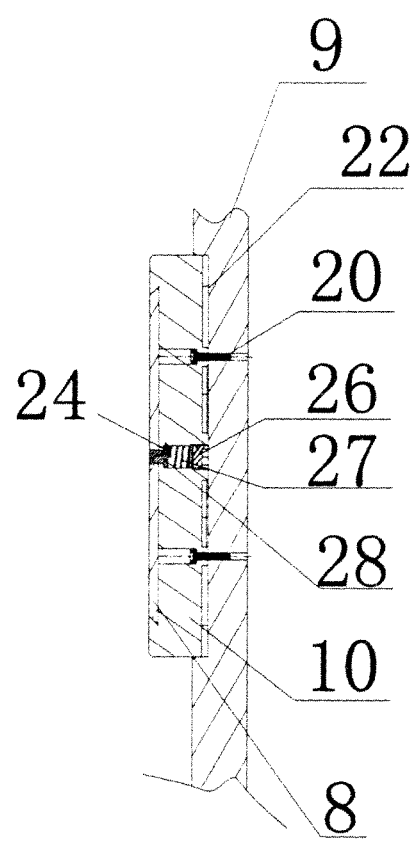
FIG. 8B is a cross-sectional view taken along line B-B of FIG. 8A showing how the fixing base is connected to the slide rest.
Figure 9:
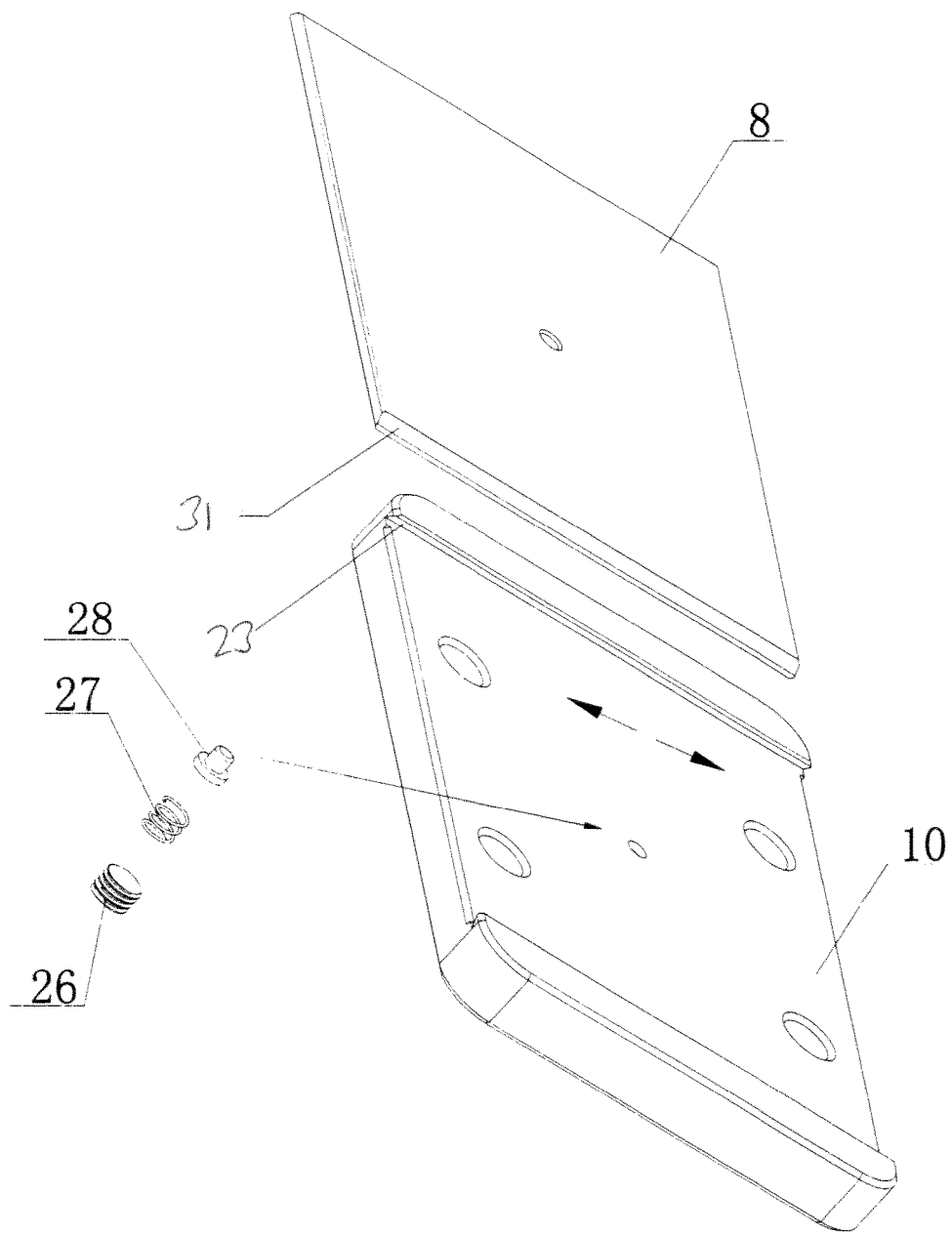
FIG. 9 is an exploded perspective view showing a detachable plate and its fixing base.
Figure 10:
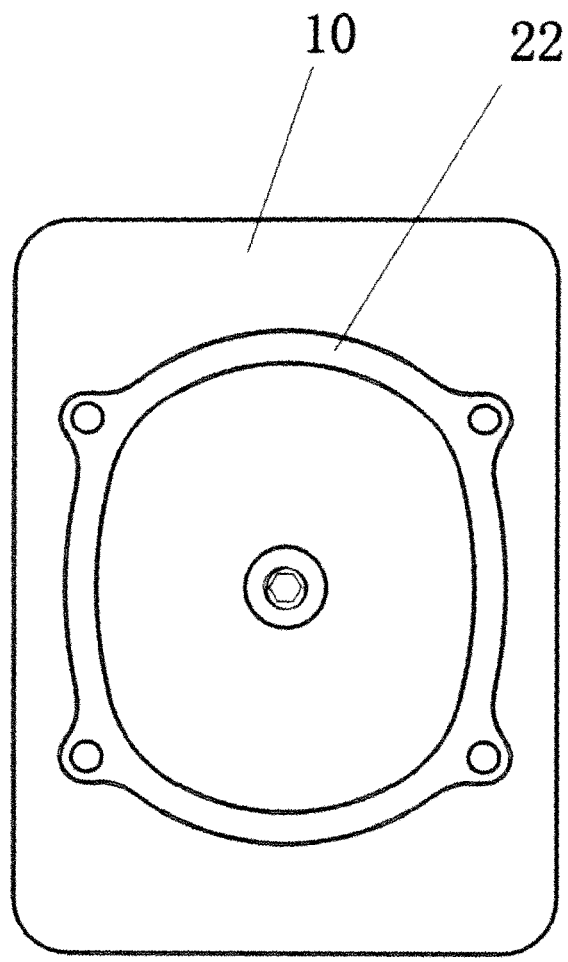
FIG. 10 is a bottom plan view of a fixing base showing its gasket.
Figure 11A:
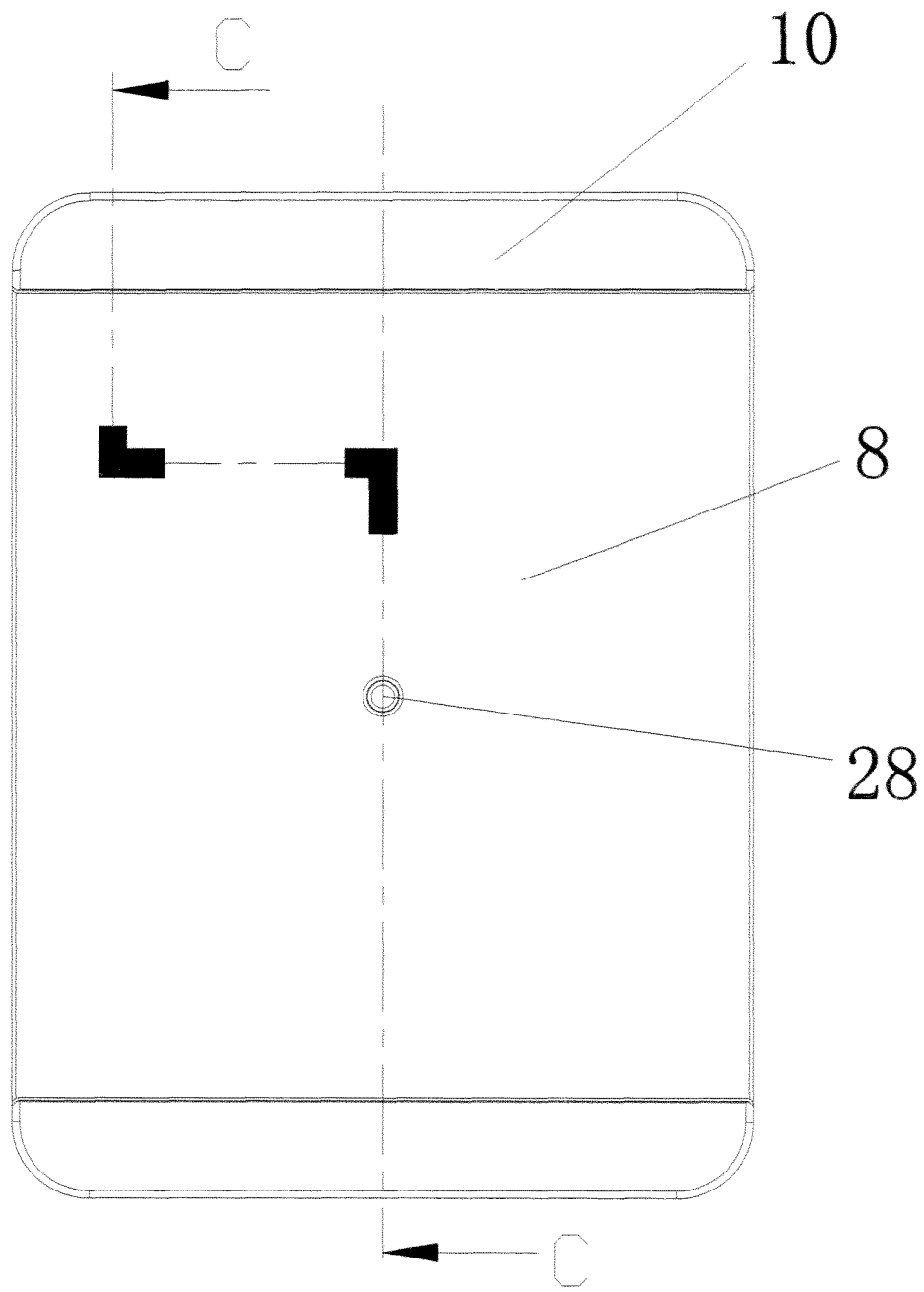
FIG. 11A is a top plan view of the detachable plate and its fixing base from FIG. 9.
Figure 11B:
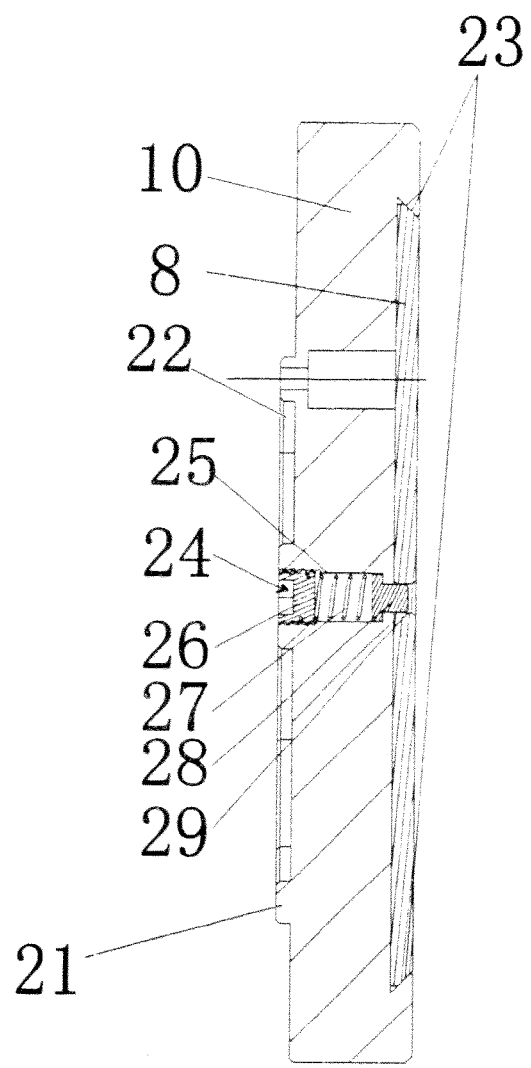
FIG. 11B is a cross-sectional view taken along line C-C of FIG. 11A showing how the detachable plate is connected with its fixing base.

Referring to FIG. 11B, angled edges 23 are provided on the upper surfaces of the fixing bases 10 to define a channel, and the detachable plates 8 are provided with beveled edges 31 that correspond to the angled edges 23 of the fixing bases 10. As a result, each detachable plate 8 is slid into, and retained inside, the corresponding channel as guided by the angled edges 23. Referring also to FIG. 8B, an attachment assembly 24 for locking the detachable plates 8 is provided inside the channel defined by the base 10 and the angled edges 23. The attachment assembly 24 is provided inside installation holes 25 of the slide rests 9. Each attachment assembly 24 includes a fixing block 26, a spring 27 and a plug pin 28. The spring 27 and the plug pin 28 are retained within the corresponding installation hole 25 by the corresponding fixing block 26. One end of each plug pin 28 extends out from the installation holes 25, and positioning holes 29 for aligning the plug pins 28 are provided on the detachable plates 8 through which the other end of each plug pin 28 can extend. Thus, the detachable plates 8 may be mounted and disassembled quickly and conveniently.

Figure 13:
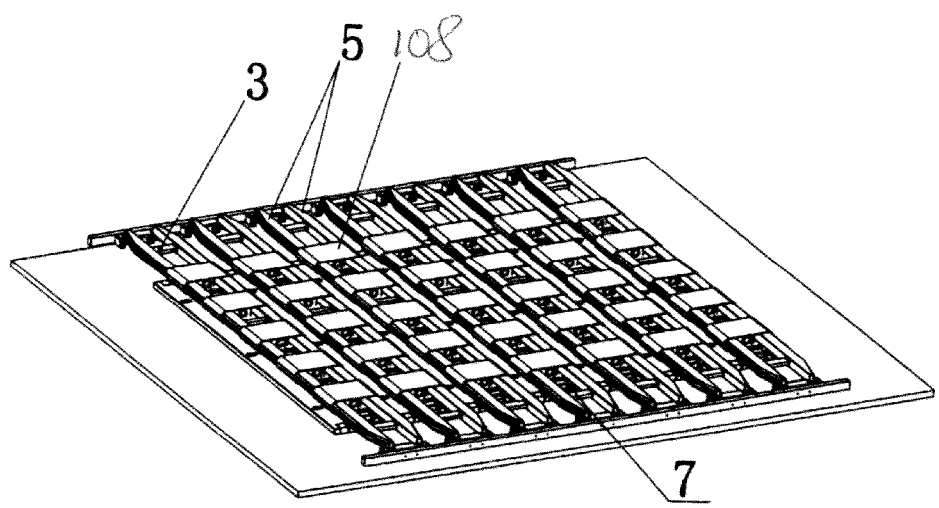
FIG. 13 is a top perspective view of the upper flat plate after the die assemblies have been secured between the positioning blocks on top of the plate fixtures.

At this point, both flat plates 1 and 2 are ready to receive the plate fixtures 7 of the die assemblies 3. A plurality of identical plate fixtures 7 are fixed in parallel on both the upper flat plate 1 and the lower flat plate 2 by inserting the opposite ends of the clamp plates 5 inside receiving slots 132 of the positioning blocks 30 (see FIG. 12). FIG. 13 illustrates the machine with the plate fixtures 7 secured to the upper flat plate 1. The lower flat plate 2 would look the same as shown in FIG. 13. Thus, each of the plate fixtures 7 may be separately disassembled or mounted and therefore may be replaced easily and quickly, so that the maintenance efficiency is also improved. In addition, the present invention promotes safety in that it is safer to disassemble the plate fixtures 7 before replacing a detachable plate 8, so accidents are avoided during the maintenance on the machine.

When a detachable plate 8 is defective, the detachable plate 8 can be replaced quickly and easily in the manner described above. Specifically, when the die assemblies 3 are removed, the defective plate 8 can be identified, and the slide rest 9 which carries the defective plate 8 can be quickly removed so that the defective plate 8 can be removed, and quickly replaced by a new plate 8. While the defective plate 8 is being replaced, another slide rest 9 can be quickly installed between the press blocks 11 and production can be continued without experiencing any delays while the defective plate 8 is being replaced. Here, both the slide rests 9 and the fixing bases 10 can be removed. This provides numerous benefits. For example, by allowing these components to be removable, the technician can replace the plates 8 without needing to work directly at the machine, thereby enhancing safety and promoting convenience. Also, this shortens the time needed to replace a defective plate 8, as these components 8, 9 and 10 can be quickly and easily removed, and re-installed on to the machine.

After all the die cores 6 are adjusted once, they will not need to be adjusted repeatedly. After use, the die cores 6 and corresponding accessories are disassembled and stored in a storehouse as a whole, and may be directly mounted on another similar machine when in further use, so that the secondary die adjustment time is eliminated, and the production efficiency is improved.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for making an inflatable product having an upper layer and a lower layer, comprising:
   providing a machine having a presser, a welder press frame, an upper flat plate secured to the presser, and a lower flat plate secured to the welder press frame, wherein each flat plate has a plurality of press blocks secured to the respective plate in an arrangement where a space is defined between adjacent pairs of press blocks;
   positioning a plurality of slide rests on to each flat plate, with each slide rest positioned in the space between each pair of adjacent press blocks, wherein each slide rest has a plurality of detachable plates positioned along the slide rest;
   placing a lower layer of material on top of the lower flat plate and on top of the plurality of detachable plates;
   positioning a plurality of die assemblies on top of the lower layer of material in a manner where each die assembly is aligned with a corresponding slide rest, wherein each die assembly has a plurality of die cores provided thereon;
   placing an upper layer of material on top of the die assemblies and below the upper flat plate;
   pressing the upper flat plate on top of the upper layer of material to perform heat welding, wherein the plurality of detachable plates on the slide rests of the upper flat plate are aligned with the die assemblies and the plurality of detachable plates on the slide rests of the lower flat plate;
   removing the die assemblies from the lower flat plate;
   identifying a defective detachable plate from one of the slide rests of either the upper flat plate or the lower flat plate;
   removing the slide rest of the defective detachable plate; and
   replacing the defective detachable plate with another detachable plate.

2. The method of claim 1, further including the step of providing the detachable plates on fixing blocks that are removably connected to the corresponding press block.

3. The method of claim 1, further including the step of:
   while the defective detachable plate is being replaced, positioning a different slide rest on to the flat plate to replace the slide rest that was removed.

4. A method for making an inflatable product having an upper layer and a lower layer, comprising:
   providing a machine having a presser, a welder press frame, an upper flat plate secured to the presser, and a lower flat plate secured to the welder press frame, wherein each flat plate has a plurality of press blocks secured to the respective plate in an arrangement where a space is defined between adjacent pairs of press blocks;
   positioning a plurality of slide rests on to each flat plate, with each slide rest positioned in the space between each pair of adjacent press blocks, wherein each slide rest has a plurality of detachable plates positioned along the slide rest;
   placing a lower layer of material on top of the lower flat plate and on top of the plurality of detachable plates;
   positioning a plurality of die assemblies on top of the lower layer of material in a manner where each die assembly is aligned with a corresponding slide rest, wherein each die assembly has a plurality of die cores provided thereon;
   placing an upper layer of material on top of the die assemblies and below the upper flat plate;
   pressing the upper flat plate on top of the upper layer of material to perform heat welding, wherein the plurality of detachable plates on the slide rests of the upper flat plate are aligned with the die assemblies and the plurality of detachable plates on the slide rests of the lower flat plate; and
   providing each die assembly with a clamp plate that retains a linear row of die cores, and providing a PVC coil beam around each die core.

5. The method of claim 4, further including the step of providing the detachable plates on fixing blocks that are removably connected to the corresponding press block.

* * * * *